(12) United States Patent
Iefuji

(10) Patent No.: US 7,354,386 B2
(45) Date of Patent: Apr. 8, 2008

(54) THERMAL DISPLACEMENT CORRECTING DEVICE

(75) Inventor: Nobuhiko Iefuji, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 11/556,705

(22) Filed: Nov. 6, 2006

(65) Prior Publication Data

US 2007/0105697 A1  May 10, 2007

(30) Foreign Application Priority Data

Nov. 4, 2005  (JP) .............................. 2005-320476

(51) Int. Cl.
*B23Q 3/157* (2006.01)
(52) U.S. Cl. .............................. 483/1; 483/11; 483/13
(58) Field of Classification Search ............... 483/1, 483/11, 13; 700/192, 193, 194, 195, 170, 700/174, 175; 165/206; 318/471
See application file for complete search history.

(56) References Cited

U.S. PATENT DOCUMENTS

| | | | |
|---|---|---|---|
| 4,561,415 A * | 12/1985 | Willot | 483/13 |
| 4,881,021 A * | 11/1989 | Hirai | 700/186 |
| 5,258,698 A * | 11/1993 | Piovano et al. | 483/11 |
| 5,444,640 A * | 8/1995 | Hirai | 700/193 |
| 5,513,113 A * | 4/1996 | Okada et al. | 483/11 |
| 5,581,467 A * | 12/1996 | Yasuda | 700/193 |
| 5,895,181 A * | 4/1999 | Ito et al. | 700/170 |
| 6,471,451 B2 * | 10/2002 | Kojima et al. | 700/175 |
| 2006/0089745 A1* | 4/2006 | Suzuki et al. | 700/176 |
| 2006/0218811 A1* | 10/2006 | Sato | 33/702 |

FOREIGN PATENT DOCUMENTS

| | | | |
|---|---|---|---|
| EP | 1650620 A2 * | 4/2006 | |
| JP | 61209853 A * | 9/1986 | |
| JP | 08141883 A * | 6/1996 | |
| JP | 08215983 A * | 8/1996 | |
| JP | 09085581 A * | 3/1997 | |
| JP | 2002224926 A * | 8/2002 | |
| JP | 2004148443 A * | 5/2004 | |

* cited by examiner

*Primary Examiner*—Dana Ross
(74) *Attorney, Agent, or Firm*—James Judge

(57) ABSTRACT

Machine-tool thermal displacement correcting device having: a tool-temperature estimating unit for recognizing—based on identification data obtained from a controller for designating, out of tools stowed in the tool-changer tool magazine, an exchange-target tool—the directly-after-use temperature of the ID'd tool, and estimating the tool temperature directly before use, based on the recognized directly-after-use tool temperature and on lapsed time, obtained from the controller, since previous use of the ID'd tool, and for estimating, based on the estimated directly-before-use tool temperature and on the spindle temperature, during-use temperature of the tool; a correction determining unit for estimating, based on the estimated during-use tool temperature, axial thermal displacement of the tool, and determining a correction amount for canceling out the displacement; and a correction executing unit for carrying out correction based on the determined correction amount.

4 Claims, 8 Drawing Sheets

FIG. 2

| TIME | USED TOOL (TOOL NUMBER) |
|---|---|
| 0 HOURS 0 MINUTES 0 SECONDS (MACHINING START) | T0001 |
| 0 HOURS 10 MINUTES 10 SECONDS | T0002 |
| 0 HOURS 20 MINUTES 20 SECONDS | T0005 |
| 0 HOURS 30 MINUTES 30 SECONDS | T0008 |
| 0 HOURS 40 MINUTES 40 SECONDS | T0006 |
| 0 HOURS 50 MINUTES 50 SECONDS | T0002 |
| 1 HOUR 1 MINUTE 0 SECONDS (CURRENTLY USED TOOL) | T0003 |

FIG. 3

| TOOL NUMBER | TEMPERATURE DIRECTLY AFTER USE |
|---|---|
| T0001 | **°C |
| T0002 | **°C |
| T0003 | **°C |
| T0004 | **°C |
| T0005 | **°C |
| ⋮ | ⋮ |
| T0020 | **°C |

FIG. 8

| TOOL NUMBER | LAPSE OF TIME FROM PREVIOUS USE | ACTUAL TEMPERATURE | TEMPERATURE DIRECTLY AFTER USE |
|---|---|---|---|
| T0001 | ∗∗ SECONDS | ∗∗ °C | ∗∗ °C |
| T0002 | ∗∗ SECONDS | ∗∗ °C | ∗∗ °C |
| T0003 | ∗∗ SECONDS | ∗∗ °C | ∗∗ °C |
| T0004 | ∗∗ SECONDS | ∗∗ °C | ∗∗ °C |
| T0005 | ∗∗ SECONDS | ∗∗ °C | ∗∗ °C |
| ⋮ | ⋮ | ⋮ | ⋮ |
| T0020 | ∗∗ SECONDS | ∗∗ °C | ∗∗ °C |

THERMAL DISPLACEMENT CORRECTING DEVICE

BACKGROUND OF THE INVENTION

1. Technical Field

The present invention relates to thermal displacement correcting devices for correcting axial thermal displacement of a tool attached to the spindle of a machine tool.

2. Description of the Related Art

In machine-tool installations such as machining centers, the bearings that rotatably support the tool spindle run hot, such that the heat occurring due to the thermal emission is transferred to the spindle, and the tool chucked onto the spindle, and elongates the tool. This elongating of a tool degrades its machining accuracy.

Against this backdrop, to prevent such degradation to machining accuracy, correction methods—an example of which is disclosed in Japanese Unexamined Pat. App. Pub. No. 2004-148443—of correcting tool thermal displacement along the spindle axis orientation have been proposed to date.

The correcting method in JP 2004-148443 is performed by: measuring a first machine-tool temperature near the spindle bearing, and a second machine-tool temperature of a region of the machine tool having high thermal stability, such as the bed; estimating thermal displacement (correction amount) of the tool axially from a predetermined formula for computation on the basis of the difference between the measured first machine-tool temperature and second machine-tool temperature; and correcting the position of the tool axially on the basis of the estimated thermal displacement (correction amount). Performing correction in this ways allows canceling out of the tool thermal displacement to enable machining of a workpiece while preventing degradation in the machining accuracy.

Nevertheless, machine tools have tool magazines in which tools are stowed, and are also provided with a tool changer for exchanging a tool attached to the spindle with a tool stowed in the tool magazine. The machining of workpieces is performed using various tools, with the tool changer exchanging the tool attached to the spindle with a tool in the tool magazine.

Furthermore, a tool removed from the spindle and stowed in the tool magazine gradually cools, eventually arriving at a temperature at the same level as room temperature; but cooling to the room-temperature level takes a given amount of time. Consequently, the tools stowed in the tool magazine each differ in temperature, depending on whether the tool, not having been chucked to the spindle, is not yet used, whether, since the tool was stowed in the tool magazine, the given amount of time has elapsed for the tool temperature to drop to the room-temperature level, or whether, since the tool was stowed in the tool magazine, the given amount of time has not elapsed and the tool temperature is in the midst of dropping.

Thus, the temperature at a start of spindle-chucking when the tool is chucked to the spindle by the tool changer differs according to the tool, and if the tool temperature at spindle-chucking start is different, the change in temperature (thermal displacement) of the tool thereafter will also vary.

Accordingly, to carry out a more rigorous thermal displacement correction, tool temperature at the start of chucking to the spindle must be taken into consideration in calculating thermal displacement of a tool. Nonetheless, in the method in which a first machine-tool temperature near the spindle bearing, and a second machine-tool temperature of a region of the machine tool having high thermal stability are measured to estimate the thermal displacement of the tool—i.e., the above-described conventional thermal displacement correction technique—this point is not taken into consideration, which is prohibitive of performing high-precision correction.

A further problem with this conventional solution is that sensors for measuring the first machine-tool temperature and the second machine-tool temperature are required, raising production costs and complicating the device configuration.

BRIEF SUMMARY OF THE INVENTION

The present invention was brought about taking into consideration the above-described problems, and it is an object of the present invention to provide a thermal displacement correcting device capable of determining with high precision a correction amount for canceling out the thermal displacement axially of a tool attached to a machine-tool spindle, to perform machining with high accuracy.

For attaining the above-described object, the present invention relates to a thermal displacement correcting device provided in a machine tool furnished with a spindle device having a spindle to which a tool is attached, and which rotates the spindle axially, and is provided so as to be relatively movable axially, a feeder which relatively moves the spindle device axially, a tool changer having a tool magazine in which tools are accommodated and which changes a tool accommodated in the tool magazine and a tool attached to the spindle of the spindle device, and a controller which controls operations of the spindle device, the feeder, and the tool changer, that is, controls the feeder on the basis of target shifting-position data of the spindle device to relatively move the spindle device to the target shifting position, and controls the tool changer on the basis of identification data of an exchange-target tool accommodated in the tool magazine to change the tool corresponding to the identification data with the tool attached to the spindle, and which corrects thermal displacement axially occurring in the tool attached to the spindle, wherein the thermal displacement correcting device is configured to carry out: a process of recognizing an exchange-target tool corresponding to the identification data on the basis of the identification data obtained from the controller, and estimating a temperature directly before use of the recognized tool on the basis of use log information of the tool; a process of estimating a tool temperature during use on the basis of the estimated tool temperature directly before use and a temperature of the spindle; a process of estimating a thermal displacement of the spindle axially on the basis of the estimated tool temperature during use, and setting a correction amount for canceling the same; and a process of correcting the target shifting position on the basis of the set correction amount.

According to the present invention, a process is first performed of recognizing, on the basis of identification data obtained from the controller, an exchange-target tool corresponding to the identification data, and estimating a temperature directly before use (directly before attachment to the spindle) of the recognized tool on the basis of use long information of the tool, and a process is then performed of estimating a tool temperature during use (during attachment to the spindle of the tool) on the basis of the estimated tool temperature directly before use and the temperature of the spindle. Successively, a process is performed of estimating a thermal displacement of the tool axially on the basis of the estimated tool temperature during use, and setting a correction amount canceling the same, and finally, a process is performed of correcting the target shifting position of the spindle device relatively moved by the feeder on the basis of the set correction amount.

According to the thermal displacement correcting device of the present invention, the temperature directly before use of the tool to be attached to the spindle by the tool change is estimated, the tool temperature during use is estimated on the basis of the estimated tool temperature directly before use, etc., and the thermal displacement of the tool axially (correction amount) is estimated on the basis of the estimated tool temperature during use. Thus, the thermal displacement (correction amount) can be estimated with high precision, realizing machining with high accuracy.

Additionally, the thermal displacement correcting device comprises a log information storage unit for storing a temperature directly after use as the use log information for each tool to be accommodated in the tool magazine, a tool temperature estimating unit for executing a process of recognizing the tool corresponding to the identification data on the basis of the identification data obtained from the controller, reading a temperature directly after use of the recognized tool from the log information storage unit, and estimating a tool temperature directly before use on the basis of the read tool temperature and the lapse of time from the previous use of the tool corresponding to the identification data obtained from the controller, a process of estimating a tool temperature during use on the basis of the estimated tool temperature directly before use and the temperature of the spindle, and a process of storing a temperature of the tool attached to the spindle directly before a tool change by the tool changer as the temperature directly after use in the log information storage unit, a correction setting unit for estimating a thermal displacement of the tool axially on the basis of the tool temperature during use estimated by the tool temperature estimating unit, and setting a correction amount for canceling the same, and a correction executing unit for correcting the target shifting position on the basis of the correction amount set by the correction setting unit.

In this case, the thermal displacement correction is performed below. First, the tool temperature estimating unit, on the basis of identification data obtained from the controller, recognizes the tool corresponding to the identification data, and reads a temperature directly after use of the recognized tool from the log information storage unit. Then, the tool temperature estimating unit estimates a temperature directly before use of the tool on the basis of the read tool temperature and the lapse of time from the previous use of the tool corresponding to the identification data obtained from the controller. Finally, the tool temperature estimating unit estimates a tool temperature during use on the basis of the estimated tool temperature directly before use and a temperature of the spindle.

Then, the correction setting unit estimates a thermal displacement of the tool axially on the basis of the tool temperature during use estimated by the tool temperature estimating unit, and sets a correction amount for canceling the same. The correction executing unit corrects the target shifting position on the basis of the set correction amount. It should be noted that when a tool change is performed by the tool changer, the log information storage unit stores a temperature of the tool attached to the spindle directly before the tool change as the tool temperature directly after use by the tool temperature estimating unit.

Additionally, the thermal displacement correcting device comprises a log information storage unit for storing a temperature directly after use, a lapse of time from the previous use, and an actual temperature of a tool updated at regular time intervals as use log information for each tool accommodated in the tool magazine, a log information updating unit for, with respect to each tool accommodated in the tool magazine, updating the lapse of time from the previous use stored in the log information storage unit, estimating an actual temperature of the tool on the basis of the temperature directly after use and the lapse of time from the previous use stored in the log information storage unit, and updating the actual temperature stored in the log information storage unit with the estimated actual temperature, a tool temperature estimating unit for executing a process of confirming a tool corresponding to identification data on the basis of the identification data obtained from the controller, reading an actual temperature of the recognized tool from the log information storage unit and estimating a tool temperature during use on the basis of the read actual temperature and the temperature of the spindle, and a process of storing a temperature of the tool attached to the spindle directly before a tool change by the tool changer as the temperature directly after use in the log information storage unit, a correction setting unit for estimating a thermal displacement of the tool axially on the basis of the tool temperature during use estimated by the tool temperature estimating unit, and setting a correction amount for canceling the same, and a correction executing unit for correcting the target shifting position on the basis of the correction amount set by the correction setting unit.

In this case, the thermal displacement correction is performed as described below. First, the tool temperature estimating unit recognizes, on the basis of identification data obtained from the controller, the tool corresponding to the identification data, reads an actual temperature of the recognized tool from the log information storage unit, and estimates a tool temperature during use on the basis of the read actual temperature and the temperature of the spindle.

Then, the correction setting unit estimates a thermal displacement of the tool axially on the basis of the tool temperature during use estimated by the tool temperature estimating unit, sets a correction amount for canceling the same. The correction executing unit corrects the target shifting position on the basis of the set correction amount.

It should be noted that the log information storage unit stores as the tool temperature directly after use a temperature of the tool attached to the spindle directly before the tool change when a tool change is performed by the tool changer. Additionally, the log information updating unit updates a lapse of time from the previous use stored in the log information storage unit, estimates an actual temperature of the tool on the basis of the temperature directly after use and the lapse of time from the previous use stored in the log information storage unit, and updates the actual temperature stored in the log information storage unit with the estimated actual temperature.

Each of the tool temperature estimating unit and the correction setting unit may estimate the tool temperature directly before use, the tool temperature during use, and the thermal displacement of the tool axially on the basis of different estimation parameters for each tool. Each of the log information updating unit, the tool temperature estimating unit, and the correction setting unit may estimate the actual temperature of the tool, the tool temperature during use, and the thermal displacement of the tool axially on the basis of different estimation parameters for each tool. Thus, even if the tool behave differently from each other due to the differences in length, diameters, materials, coefficient of linear expansion, etc., it is possible to estimate the tool temperature directly before use, the tool actual temperature, the tool temperature during use, and the thermal displacement of the tool axially more precisely.

The thermal displacement correcting device further comprises a spindle temperature estimating unit for estimating a temperature of the spindle on the basis of an operational status of the spindle device obtained from the controller, and the tool temperature estimating unit estimates the tool temperature during use on the basis of the temperature of the spindle estimated by the spindle temperature estimating unit. This eliminates the need of a sensor for measuring temperature of the spindle, capable of reducing a manufacturing cost, and preventing a device configuration from being complicated.

As described above, according to the thermal displacement correcting device of the present invention, a temperature directly before use of the tool to be attached to the spindle by the tool change is estimated, on the basis of the estimated tool temperature directly before use, etc. a tool temperature during use is estimated, and, a thermal displacement (correction amount) of the tool axially is estimated on the basis of the estimated tool temperature during use. Thus, the thermal displacement (correction amount) can be estimated with high precision, realizing machining with high accuracy. Also, estimating the temperature of the spindle on the basis of the operational status of the spindle device obtained from the controller eliminates a need of a sensor for measuring temperature of the spindle, capable of reducing a manufacturing cost and preventing the device configuration from being complicated.

From the following detailed description in conjunction with the accompanying drawings, the foregoing and other objects, features, aspects and advantages of the present invention will become readily apparent to those skilled in the art.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 2 is an explanatory illustration showing a data structure stored in a tool usage outcome storage unit according to the present embodiment;

FIG. 3 is an explanatory illustration showing a data table stored in a log information storage unit according to the present embodiment;

FIG. 8 is an explanatory illustration showing a data table stored in a log information storage unit according to the other embodiment of the present invention.

DETAILED DESCRIPTION OF THE INVENTION

Figure 1:
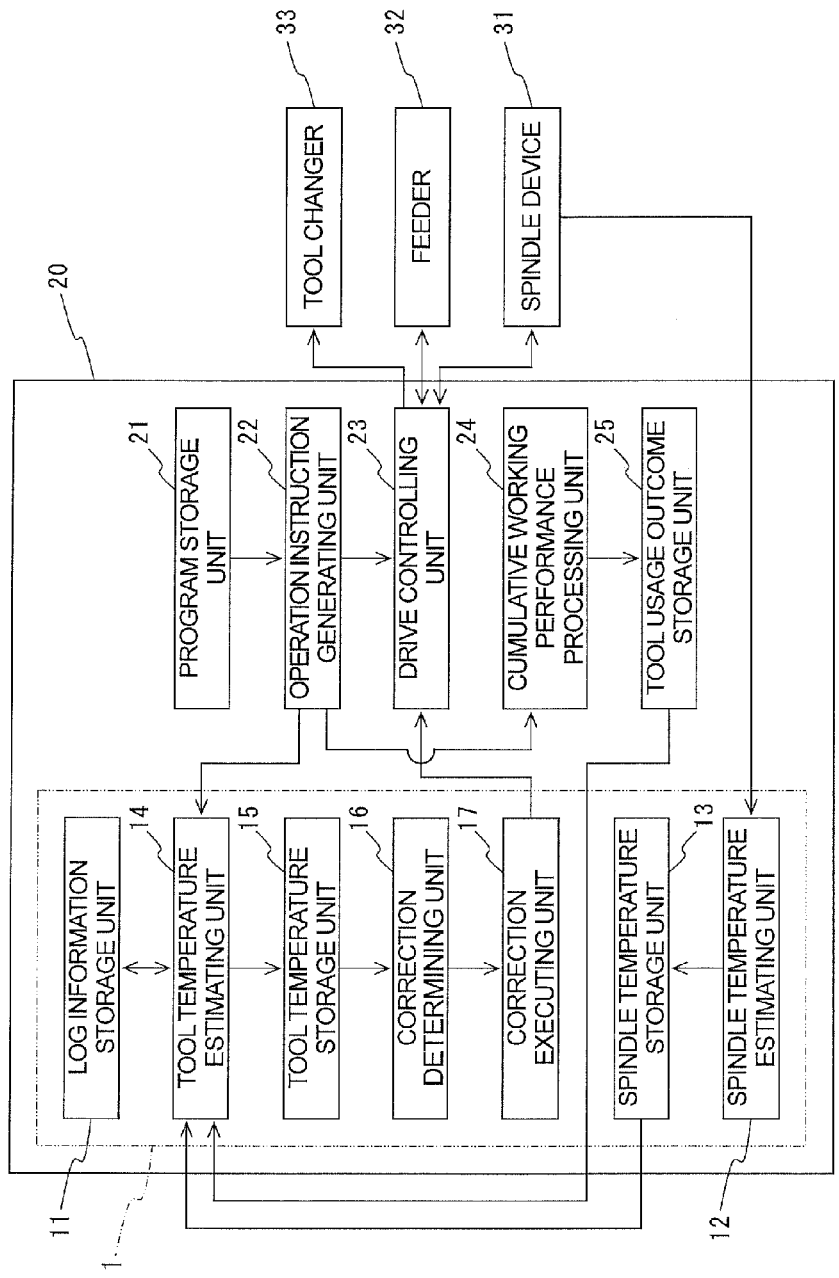
FIG. 1 is a schematic block diagram for showing a thermal displacement correcting device according to one embodiment of the present invention.

Detailed embodiments of the present invention will be explained with reference to the accompanying drawings. FIG. 1 is a schematic block diagram showing a thermal displacement correcting device of one embodiment of the present invention.

As shown in FIG. 1, a thermal displacement correcting device 1 of this example is made up of a log information storage unit 11, a spindle temperature estimating unit 12, a spindle temperature storage unit 13, a tool temperature estimating unit 14, a tool temperature storage unit 15, a correction setting unit 16, and a correction executing unit 17. The thermal displacement correcting device 1 is provided in a machine tool having a spindle device 31 placed movably in a vertical direction (along the Z-axis), for example, a table (not shown) mounted with a workpiece and placed movably in two-axis directions (along the X-axis and along the Y-axis) being orthogonal in the horizontal plane, a feeder 32 for moving the spindle device 31 along the Z-axis and moving the table (not shown) along the X-axis and the Y-axis, a tool changer 33 for moving tool change, and a controller 20 for controlling operations of the spindle device 31, the feeder 32 and the tool changer 33.

First, a description is made on the controller 20, the spindle device 31, the feeder 32, and the tool changer 33.

The controller 20 has a program storage unit 21, an operation instruction generating unit 22, a drive controlling unit 23, a cumulative working performance processing unit 24, a tool usage outcome storage unit 25, etc.

The program storage unit 21 stores in advance a machining program created as necessary. The operation instruction generating unit 22 analyses the machining program stored in the program storage unit 21 to extract an instruction signal relating to a spindle rotational speed of the spindle device 31, an instruction signal relating to shift positions of the spindle device 31 and the table (not shown), and an instruction signal relating to a tool change including tool number data (identification data) for designating an exchange-target tool. Then, the program storage unit 21, on the basis of the extracted instruction signals, etc., generates data (operation instruction signal) relating to a target rotational speed of the spindle, data (operation instruction signal) relating to target shifting positions of the spindle device 31 and the table (not shown), and an operation instruction signal relating to a tool change, and transmits the generated operation instruction signals to the drive controlling unit 23. Additionally, the operation instruction signal relating to a tool change is also transmitted to the cumulative working performance processing unit 24 and the thermal displacement correcting device 1.

The drive controlling unit 23 performs a process of generating a driving instruction signal on the basis of the operation instruction signal (spindle target rotational speed data) received from the operation instruction generating unit 22 and the signal (signal relating to the spindle rotation speed) fed back from the spindle device 31, and transmitting the generated driving instruction signal to the spindle device 31. Also, the drive controlling unit 23 performs a process of generating a driving instruction signal on the basis of the operation instruction signal (target shifting-position data of the spindle device 31 and the table (not shown)) received from the operation instruction generating unit 22 and the signal fed back from the feeder 32 (signal relating to a shift position of the spindle device 31 along the Z-axis, and a signal relating to a shift position of the table (not shown) along the X-axis and along the Y-axis), and transmitting the generated driving instruction signal to the feeder 32. Additionally, the drive controlling unit 23 performs a process of generating a driving instruction signal on the basis of the operation instruction signal relating to a tool change received from the operation instruction generating unit 22, and transmitting the generated driving instruction signal to the tool changer 33.

The cumulative working performance processing unit 24 performs a process of identifying a time when the tool change is performed and the tool number of the tool to be attached to the spindle of the spindle device 31 through the tool change on the basis of the operation instruction signal relating to a tool change received from the operation instruction generating unit 22, and storing them in the tool usage outcome storage unit 25 as a working performance of the tools as shown in FIG. 2.

The spindle device 31 includes a spindle axially in parallel with the Z axis to which a tool is attached, and is configured to rotate the spindle about the axis line. Furthermore, the spindle device 31 detects a spindle rotational speed, and has a detection sensor for transmitting the detected signal relating to a spindle rotational speed as a feedback signal to the controller 20 (drive controlling unit 23 and spindle temperature estimating unit 12). It should be noted that the spindle rotational speed is controlled according to the driving instruction signal received from the drive controlling unit 23, allowing the spindle to rotate at the target rotational speed.

The feeder 32 is constructed so that the tool and the workpiece relatively move in orthogonal three-axis directions by moving the spindle device 31 along the Z-axis and moving the table (not shown) along the X-axis and the Y-axis. Furthermore, the feeder 32 has a detection sensor for detecting a shift position of the spindle device 31 along the Z-axis and a moving position of the table (not shown) along the X-axis and the Y-axis, and transmitting the detected signals relating to a shift position to the controller 20 (drive controlling unit 23) as a feedback signal.

It should be noted that the shift position of the spindle device 31 along the Z-axis and the moving position of the table (not shown) along the X-axis and the Y-axis are controlled according to the driving instruction signal received from the drive controlling unit 23, and whereby, the spindle device 31 and the table (not shown) respectively move to the target shifting position along the Z-axis and the target moving position along the X-axis direction and the Y-axis.

The tool changer 33 has a tool magazine accommodating a various tools, and is constructed so as to change the toll accommodated in the tool magazine with the tool attached to the spindle of the spindle device 31. In addition, the tool changer 33 operates according to a driving instruction signal received from the drive controlling unit 23, and changes the tool, having a tool number corresponding to the tool number data of the tool change instruction out of the plurality of tools accommodated in the tool magazine, with the tool in the spindle device 31.

Next, a description is made on the thermal displacement correcting device 1. As described above, the thermal displacement correcting device 1 is made up of the log information storage unit 11, the spindle temperature estimating unit 12, the spindle temperature storage unit 13, the tool temperature estimating unit 14, the tool temperature storage unit 15, the correction setting unit 16, and the correction executing unit 17.

The log information storage unit 11 stores, with respect to all of the tools accommodated in the tool magazine of the tool changer 33, a temperature directly after use as at least log information of each tool. More specifically, as shown in FIG. 3, a tool number and a temperature directly after use of the tool having the tool number are stored in association with each other. Additionally, the tool temperature is stored by the tool temperature estimating unit 14 as described below.

The spindle temperature estimating unit 12 performs a process of receiving a signal (signal relating to a spindle rotation speed) fed back to the drive controlling unit 23 from the spindle device 31 to collect an operational status (rotational operation status of the spindle) of the spindle device 31, recognizing an operational performance (spindle rotational speed, spindle rotating time, etc.) of the spindle on the basis of the collected rotational operation status of the spindle, and estimating a temperature of the spindle on the basis of the recognized spindle operational performance so as to store it in the spindle temperature storage unit 13.

Figure 4:
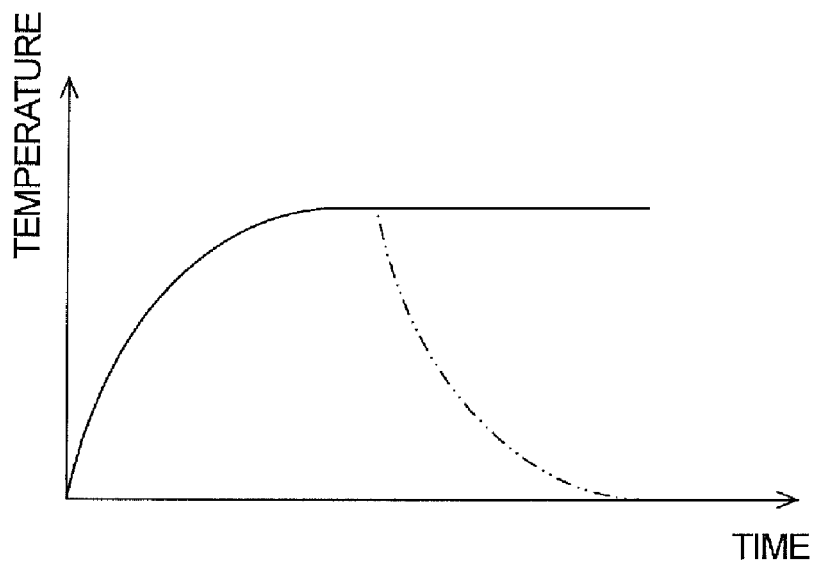
FIG. 4 is a graph showing a relationship between the temperature of the spindle and the time.

It should be noted that the estimation of the spindle temperature is performed on the basis of an empirically obtained relationship and an experimentally obtained relationship, for example. That is, FIG. 4 shows a relationship between the operation time and the temperature of the spindle, for example. In the figure, the solid line shows that the temperature of the spindle rises with the passage of time after rotation of the spindle, and enters a steady state after a set period of time. The chain double-dashed line shows that the temperature of the spindle falls with the passage of time after the stop of the spindle.

Figure 5:
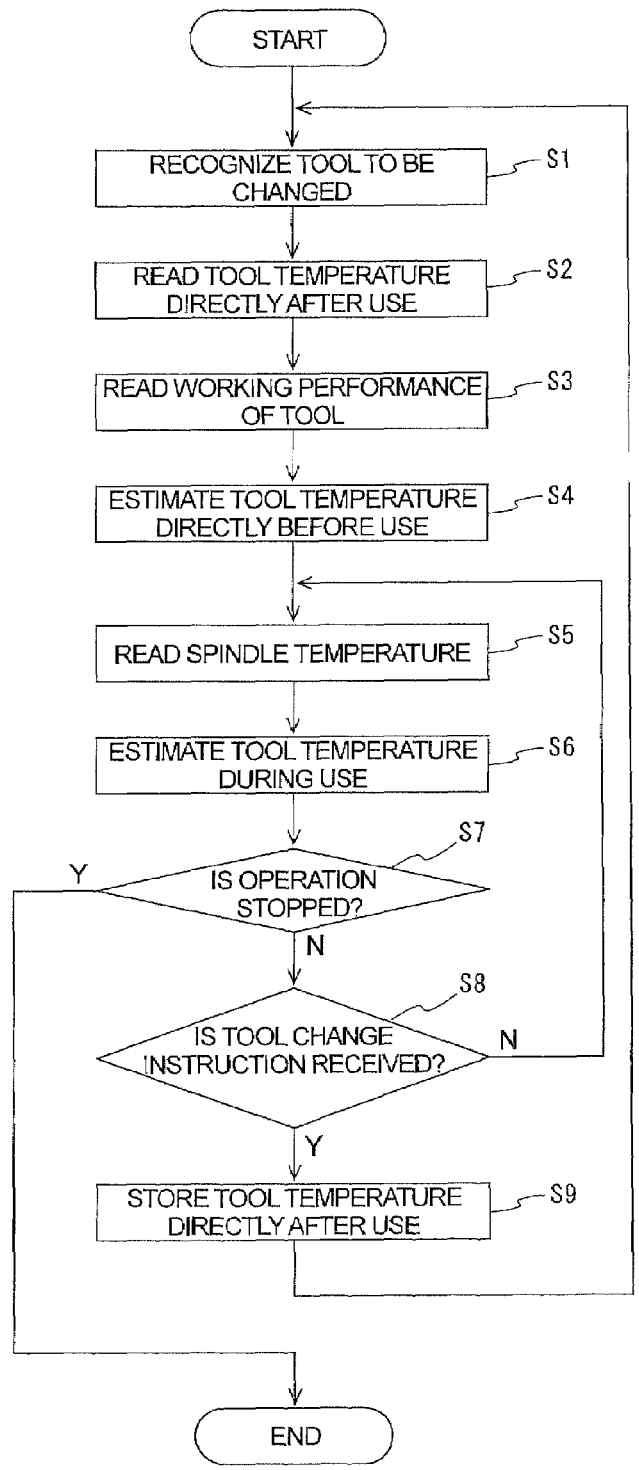
FIG. 5 is a flowchart showing a series of processes of a tool temperature estimating unit according to the present embodiment.

The tool temperature estimating unit 14 performs a temperature estimating process of a tool attached to the spindle of the spindle device 31 through a series of processes shown in FIG. 5. More specifically, after receiving an operation instruction signal relating to a tool change from the operation instruction generating unit 22 to start the series of processes, the tool temperature estimating unit 14 first recognizes, on the basis of tool number data of the received operation instruction signal relating to a tool change, a tool having a tool number corresponding to the tool number data as an exchange-target tool (step S1).

Subsequently, the tool temperature estimating unit 14 reads a temperature directly after use of the recognized tool with the tool number from the log information storage unit 11 (step S2), then reads a working performance of the recognized tool with the tool number stored in the tool usage outcome storage unit 25, and recognizes a lapse of time from the previous use (post-tool-change time lapse (post-tool-magazine-stowage time)) of the recognized tool with the tool number (step S3).

Then, the tool temperature estimating unit 14 estimates the tool temperature directly before use (directly before attachment of the tool to the spindle) (current) on the basis of the read temperature directly after use and the recognized lapse of time from the previous use (step S4), and then reads a temperature of the spindle stored in the spindle temperature storage unit 13 (step S5). It should be noted that the estimation of the tool temperature in the step S4 is performed on the basis of the empirically obtained relationship, the experimentally obtained relationship, and a relationship set for each tool, for example.

Figure 6:
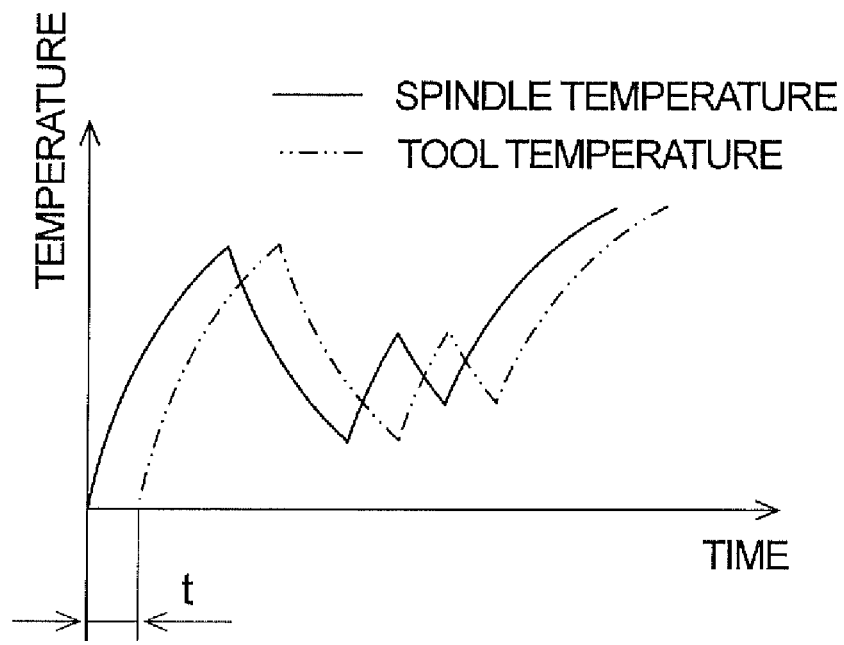
FIG. 6 is a graph showing a relationship between the temperature and the time of a spindle and a tool.

Then, the tool temperature estimating unit 14 estimates a tool temperature during use (during attachment of the tool to the spindle) on the basis of the estimated tool temperature directly before use and the read temperature of the spindle, and stores it in the tool temperature storage unit 15 (step S6). It should be noted that the estimation of the tool temperature is performed on the basis of the empirically obtained relationship, the experimentally obtained relationship, and a relationship set for each tool, for example. Briefly, the estimation of the tool temperature is, for example, shown in FIG. 6 in which the temperature changes of the spindle and the temperature changes of the tool attached thereto take approximately the same temperature rise curve and the temperature fall curve, and the temperature of the tool changes varies after the set amount of time t from the temperature changes of the spindle.

Subsequently, the tool temperature estimating unit 14 confirms whether or not the operation is being continued (step S7). If the operation is stopped, the series of processes is ended. Alternatively, if the operation is being continued, the process proceeds to a step S8 to determine whether or not an operation instruction signal relating to tool change is received from the operation instruction generating unit 22. If it is not received, the process repeatedly executes the process in the above described step S5 and the onward.

On the other hand, if determining that the operation instruction signal relating to a tool change is received in the step S8, the tool temperature estimating unit 14 stores the latest tool temperature out of the tool temperatures estimated in the above-described step S6, that is, the temperature of the tool attached to the spindle directly before the tool change by the tool changer 33 as a tool temperature directly after use in the log information storage unit 11 (step S9), and then, executes the process in the above-described step S1 and the onward.

The correction setting unit 16 estimates a thermal displacement axially occurring in the tool on the basis of the tool temperature during use stored in the tool temperature storage unit 15, and sets a correction amount for canceling it. It should be noted that the estimation of the tool temperature is performed on the basis of the empirically obtained relationship, the experimentally obtained relationship, and a relationship set for each tool, for example.

The correction executing unit 17 transmits the correction amount set by the correction setting unit 16 to the drive controlling unit 23 to thereby execute a correction of the target shifting position along the Z-axis of the spindle device 31. Thus, the drive controlling unit 23 corrects the target shifting position of the spindle device 31 along the Z-axis on the basis of the correction amount transmitted from the correction executing unit 17, and generates a driving instruction signal on the basis of the corrected target shifting position, etc.

According to the thermal displacement correcting device 1 constructed as described above, after confirming the tool number of the exchange-target tool on the basis of the operation instruction signal received from the operation instruction generating unit 22, the tool temperature estimating unit 14 estimates the tool temperature directly before use on the basis of the temperature directly after use of the confirmed tool with the tool number and the a lapse of time from the previous use of the confirmed tool with the tool number, and then estimates the tool temperature during use on the basis of the estimated tool temperature directly before use and the temperature of the spindle estimated by the spindle temperature estimating unit 12 based on the operational status of the spindle device 31.

Next, after the tool temperature estimating unit 14 estimates the tool temperature during use, the correction setting unit 16 estimates a thermal displacement occurring in the tool axially on the basis of the estimated tool temperature during use, and sets a correction amount for canceling it. The correction executing unit 17 then corrects the target shifting position of the spindle device 31 along the Z-axis on the basis of the set correction amount.

According to the thermal displacement correcting device 1 of this example, a temperature directly before use of the tool to be attached to the spindle through the tool change is estimated, a tool temperature during use is estimated on the basis of the estimated tool temperature directly before use, etc. and a thermal displacement (correction amount) of the tool axially is estimated on the basis of the estimated tool temperature during use. Thus, it is possible to more precisely estimate the thermal displacement (correction amount) of the tool axially, capable of realizing machining with high precision.

Additionally, each of the tool temperature directly before use, the tool temperature during use, and the thermal displacement of the spindle axially is estimated according to a relationship set for each tool. Thus, if the tools are different in length, diameter, material, coefficient of linear expansion, etc. to thereby behave differently, it is possible to more precisely estimate the tool temperature directly before use, the tool temperature during use, and the thermal displacement of the spindle axially.

Furthermore, estimating the temperature of the spindle according to an operational status of the spindle device 31 eliminate a need of preparing a sensor for measuring temperature of the spindle, making it possible to keep the production cost down, and to prevent the device configuration from being complicated.

One embodiment of the present invention is explained above, but no restriction is put on detailed examples employing this invention.

Figure 7:
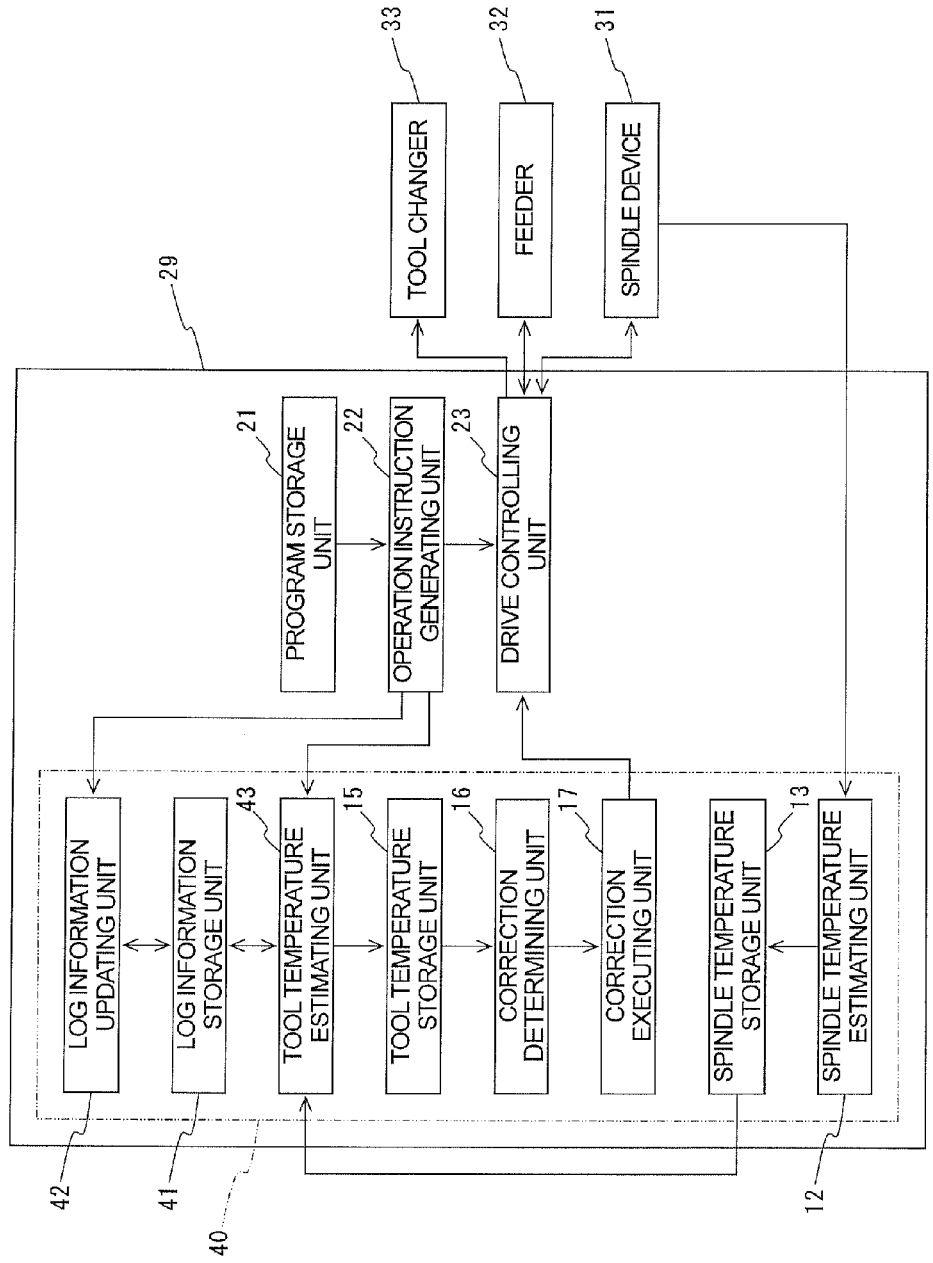
FIG. 7 is a schematic block diagram showing a thermal displacement correcting device according to another embodiment of the present invention.

In the above described example, the thermal displacement correcting device 1 is made up of the log information storage unit 11, the spindle temperature estimating unit 12, the spindle temperature storage unit 13, the tool temperature estimating unit 14, the tool temperature storage unit 15, the correction setting unit 16, and the correction executing unit 17, but no restriction is put on them. As shown in FIG. 7, another example is a thermal displacement correcting device 40 made up of a log information storage unit 41, a log information updating unit 42, a spindle temperature estimating unit 12, a spindle temperature storage unit 13, a tool temperature estimating unit 43, a tool temperature storage unit 15, a correction setting unit 16, and a correction executing unit 17.

In this case, the thermal displacement correcting device 40 is set in a controller 29 provided with a program storage unit 21, an operation instruction generating unit 22, a drive controlling unit 23, etc. It should be noted that the parts which are identical to those in the above described thermal displacement correcting device 1 and the controller 20 are denoted by the same reference numerals, and the detailed description is omitted. Additionally, an operation instruction signal relating to a tool change from the operation instruction generating unit 22 is also transmitted to the log information updating unit 42.

With respect to all the tools accommodated in the tool magazine of the tool changer 33, the log information storage unit 41 stores a temperature directly after use, a lapse of time from the previous use (post-tool-change time lapse (post-tool-magazine-stowage time)), and an actual temperature (current temperature) of the tool as at least log information of each tool. More specifically, as shown in FIG. 8, a tool number, and a temperature directly after use, lapse of time from the previous use and actual temperature of the tool corresponding to the tool number are stored in association with each other.

The log information updating unit 42 performs a process of updating the log information (a lapse of time from the previous use and an actual temperature of the tool) stored in the log information storage unit 41. More specifically, the log information updating unit 42 recognizes, on the basis of tool number data of the operation instruction signal relating to a tool change received from the operation instruction generating unit 22, a tool with the tool number corresponding to the tool number data as an exchange-target tool, and recognizes the tool attached to the spindle and the tools accommodated in the tool magazine.

Then, with respect to each of the recognized tools accommodated in the tool magazine, the log information updating unit 42 updates the lapse of time from the previous use stored in the log information storage unit 41, estimates an actual temperature of the tool on the basis of a temperature directly after use and a lapse of time from the previous use stored in the log information storage unit 41, and updates the actual temperature stored in the log information storage unit 41 with the estimated actual temperature. Also, the updates of the lapse of time and the actual temperature are executed at regular time intervals. Additionally, the estimation of the tool actual temperature is performed on the basis of an empirically obtained relationship, an experimentally obtained relationship, a relationship set for each tool, or the like.

Figure 9:
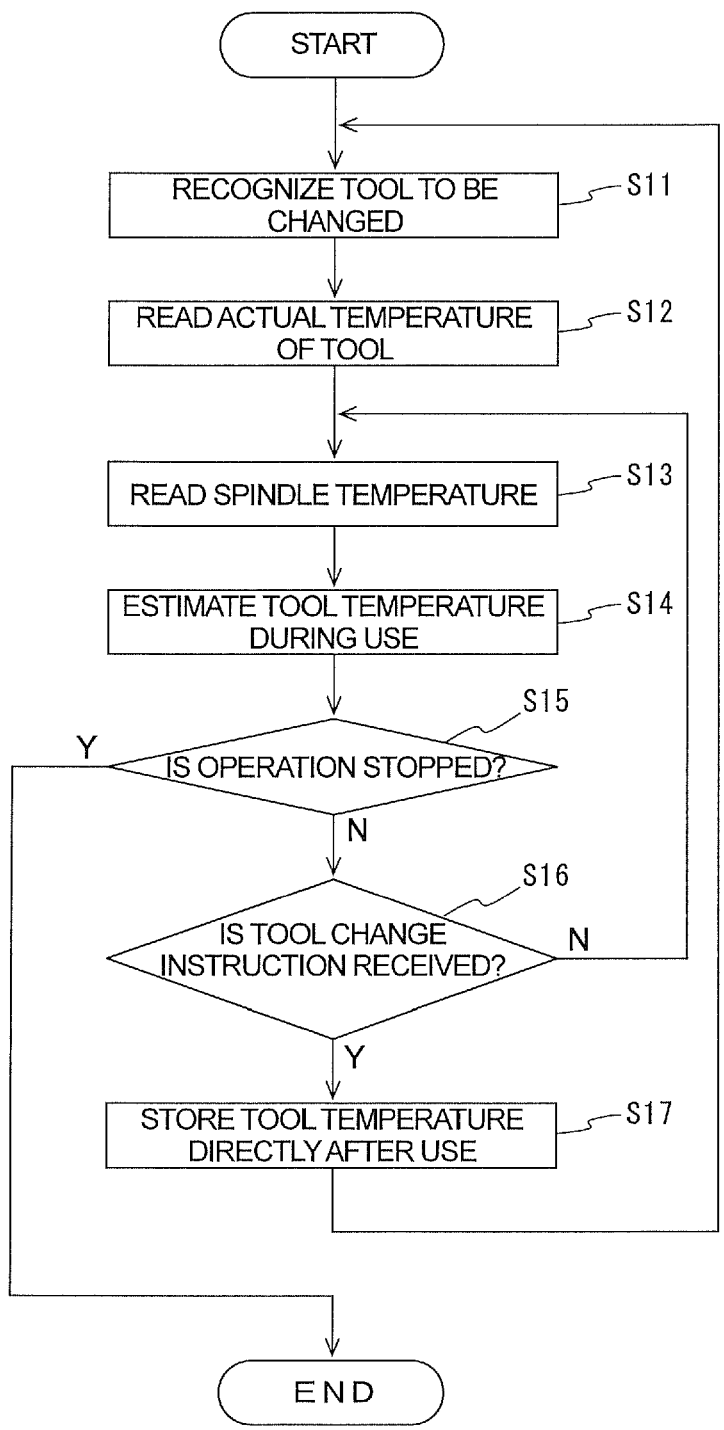
FIG. 9 is a flowchart showing a series of processes of a tool temperature estimating unit according to the other embodiment of the present invention.

The tool temperature estimating unit 43 performs a temperature estimating process of the tool attached to the spindle of the spindle device 31 by performing the process shown in FIG. 9. More specifically, after starting the series of processes in response to the reception of the operation instruction signal relating to a tool change from the operation instruction generating unit 22, the tool temperature estimating unit 43 first recognizes a tool with the tool number corresponding to the tool number data as an exchange-target tool on the basis of the tool number data of the received operation instruction signal relating to a tool change (step S11).

Next, the tool temperature estimating unit 43 reads the actual temperature of the recognized tool with the tool number from the log information storage unit 41 (step S12), reads the temperature of the spindle stored in the spindle temperature storage unit 13 (step S13), and then estimates a tool temperature during use (during attachment of the tool to the spindle) on the basis of the read actual temperature of the tool and temperature of the spindle so as to store it in the tool temperature storage unit 15 (step S14). It should be noted that the estimation of the tool temperature is performed on the basis of an empirically obtained relationship, an experimentally obtained relationship, a relationship set for each tool, or the like as described above. Briefly, the estimation of the tool temperature is, for example, shown in FIG. 6 in which the temperature changes of the spindle and the temperature changes of the tool attached thereto take approximately the same temperature rise curve and the temperature fall curve, and the temperature of the tool changes varies after the set amount of time t from the temperature changes of the spindle.

Subsequently, the tool temperature estimating unit 43 confirms whether or not the operation is being continued (step S15). If the operation is stopped, the series of processes is ended. Alternatively, if the operation is being continued, the process proceeds to a step S16 to determine whether or not an operation instruction signal relating to a tool change is received from the operation instruction generating unit 22. If it is not received, the process repeatedly executes the process in the above described step S13 and the onward.

On the other hand, if determining that the operation instruction signal relating to a tool change is received in the step S16, the tool temperature estimating unit 43 stores the latest tool temperature out of the tool temperatures estimated in the above-described step S14, that is, the temperature of the tool attached to the spindle directly before the tool change by the tool changer 33 as a tool temperature direct after use in the log information storage unit 41 (step S17), and then, executes the process in the above-described step S11 and the onward.

The thermal displacement correcting device 40 thus constructed estimates an actual temperature of the tool to be attached by the tool change, estimates a tool temperature during use on the basis of the estimated actual temperature, etc., and estimates a thermal displacement of the spindle axially (correction amount) on the basis of the estimated tool temperature during use. This allows a more precise thermal displacement (correction amount) and machining with high precision, capable of offering an advantage the same as the above description.

In the above example, only the thermal displacement of the tool is estimated to set a correction amount for canceling it, but no restriction is put. The thermal displacement of the spindle may be estimated and calculated as necessary to set the correction amounts for canceling the thermal displacement of the spindle and the thermal displacement of the tool. Additionally, by estimating elongation of the spindle from the spindle temperature estimated on the basis of an operational status of the spindle device 31, the thermal displacement of the spindle can be estimated on the basis of the elongation of the spindle, for example.

Furthermore, in the above-described example, the temperature of the spindle is estimated on the basis of the operational status of the spindle device 31, but it may be possible that a sensor for measuring the temperature is provided in the spindle device 31 to thereby measure the temperature of the spindle by the sensor.

In addition, a manner for estimating tool temperatures is not restricted to the above description, but any manners can be employed.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A thermal displacement correcting device, provided in a machine tool furnished with
    a spindle device having a spindle for carrying a tool, the spindle device for rotating the spindle on its center axis, and being provided so as to be relatively movable axially,
    a feeder for relatively moving the spindle device along the spindle axis,
    a tool changer having a tool magazine in which tools are accommodated, the tool changer for exchanging tools accommodated in the tool magazine with tools attached to the spindle-device spindle, and a controller for controlling operations of the spindle device, the feeder, and the tool changer, the controller configured to control the feeder on the basis of spindle-device target shifting-position data, to relatively move the spindle device to the target shifting position, and configured to control the tool changer on the basis of identification data for an exchange-target tool accommodated in the tool magazine, to exchange the tool corresponding to the identification data with a tool on the spindle, and which corrects thermal displacement axially occurring in the tool carried by the spindle, the thermal displacement correcting device comprising:

a log information storage unit for storing as information pertaining to the use log, for each tool accommodated in the tool magazine, temperature directly after that tool's use;

a spindle temperature estimating unit for estimating a temperature of the spindle on the basis of an operational status of the spindle device obtained from the controller;

a tool temperature estimating unit for recognizing a tool corresponding to the identification data on the basis of the identification data obtained from the controller, reading from the log information storage unit the directly-after-use temperature of the recognized tool, and estimating the tool temperature directly before use on the basis of the read tool temperature and lapsed time, obtained from the controller, since the previous use of said tool corresponding to the identification data, and for estimating a during-use temperature of the tool on the basis of the estimated directly-before-use tool temperature and the temperature of the spindle estimated by the spindle temperature estimating unit, and for storing in the log information storage unit temperature of the spindle-carried tool, directly before tool exchange by the tool changer, as that tool's temperature directly after use;

a correction determining unit for estimating an axial thermal displacement of the tool on the basis of the during-use tool temperature estimated by the tool temperature estimating unit, and determining a correction amount for canceling out the displacement; and a correction executing unit for correcting the target shifting position on the basis of the correction amount determined by the correction determining unit.

2. A thermal displacement correcting device according to claim 1, wherein the tool temperature estimating unit and the correction determining unit estimate the tool temperature directly before use, the tool temperature during use, and the thermal displacement of the tool axially on the basis of different estimation parameters for each tool.

3. A thermal displacement correcting devices, provided in a machine tool furnished with a spindle device having a spindle for carrying a tool, the spindle device for rotating the spindle on its center axis, and being provided so as to be relatively movable axially, a feeder for relatively moving the spindle device along the spindle axis, a tool changer having a tool magazine in which tools are accommodated, the tool changer for exchanging tools accommodated in the tool magazine with tools attached to the spindle-device spindle, and a controller for controlling operations of the spindle device, the feeder, and the tool changer, the controller configured to control the feeder on the basis of spindle-device target shifting-position data, to relatively move the spindle device to the target shifting position, and configured to control the tool changer on the basis of identification data for an exchange-target tool accommodated in the tool magazine, to exchange the tool corresponding to the identification data with a tool on the spindle, and which corrects thermal displacement axially occurring in the tool carried by the spindle, the thermal displacement correcting device comprising:

a log information storage unit for storing as information pertaining to the use log, for each tool accommodated in the tool magazine, temperature directly after use, time lapse since previous use, and, updated at regular time intervals, actual temperature of that tool;

a log information updating unit for updating, with respect to each tool accommodated in the tool magazine, the since-previous-use time lapse stored in the log information storage unit, estimating actual temperature of the tool on the basis of the directly-after-use temperature and since-previous-use time lapse stored in the log information storage unit, and updating the actual temperature stored in the log information storage unit with the estimated actual temperature;

a spindle temperature estimating unit for estimating a temperature of the spindle on the basis of an operational status of the spindle device obtained from the controller;

a tool temperature estimating unit for recognizing a tool corresponding to the identification data on the basis of the identification data obtained from the controller, reading from the log information storage unit the actual temperature of the recognized tool, and estimating temperature of the tool during use on the basis of the read actual temperature and the temperature of the spindle estimated by the spindle temperature estimating unit, and for storing in the log information storage unit temperature of the spindle-carried tool, directly before tool exchange by the tool changer, as that tool's temperature directly after use;

a correction determining unit for estimating an axial thermal displacement of the tool on the basis of the during-use tool temperature estimated by the tool temperature estimating unit, and determining a correction amount for canceling out the displacement; and a correction executing unit for correcting the target shifting position on the basis of the correction amount determined by the correction determining unit.

4. A thermal displacement correcting device according to claim 3, wherein the log information updating unit, the tool temperature estimating unit, and the correction determining unit estimate the actual temperature of the tool, the tool temperature during use, and the thermal displacement of the tool axially on the basis of different estimation parameters for each tool.

* * * * *